(12) United States Patent
Chuang

(10) Patent No.: US 6,768,633 B2
(45) Date of Patent: Jul. 27, 2004

(54) EXTERNAL POWER SUPPLY MODULE ADAPTED TO BE DISPOSED IN A PORTABLE ELECTRONIC APPARATUS

(75) Inventor: Wei-Pin Chuang, Taipei (TW)

(73) Assignee: Compal Electronics, Inc., Taipei (TW)

(*) Notice: Subject to any disclaimer, the term of this patent is extended or adjusted under 35 U.S.C. 154(b) by 0 days.

(21) Appl. No.: 10/329,565

(22) Filed: Dec. 27, 2002

(65) Prior Publication Data
US 2004/0095713 A1 May 20, 2004

(30) Foreign Application Priority Data
Nov. 15, 2002 (TW) .................................. 091218420 A

(51) Int. Cl.[7] .............................................. G06F 1/16
(52) U.S. Cl. .................... 361/679; 361/707; 364/708.1; 312/223.3
(58) Field of Search ................................. 361/680–687, 361/724–727, 699, 707–709; 364/708.1; 312/223.1–223.6; 173/217

(56) References Cited

U.S. PATENT DOCUMENTS

| 5,550,710 A | * | 8/1996 | Rahamim et al. ........... 361/687 |
| 5,606,519 A | * | 2/1997 | Viletto ........................ 361/685 |
| 2001/0042631 A1 | * | 11/2001 | Carrier ....................... 173/217 |

* cited by examiner

Primary Examiner—Hung Van Duong
(74) Attorney, Agent, or Firm—Bacon & Thomas, PLLC

(57) ABSTRACT

An external power supply module includes a module case adapted to be disposed in a portable electronic apparatus, an adapter circuit disposed in the module case and adapted to convert AC power to DC power that is to be supplied to the portable electronic apparatus, a set of contacts provided on the module case and adapted to establish electrical connection between the adapter circuit and the portable electronic apparatus, and a heat-dissipating unit mounted on the module case for dissipating heat generated during operation of the adapter circuit.

7 Claims, 6 Drawing Sheets

EXTERNAL POWER SUPPLY MODULE ADAPTED TO BE DISPOSED IN A PORTABLE ELECTRONIC APPARATUS

CROSS-REFERENCE TO RELATED APPLICATION

This application claims priority of Taiwanese application no. 091218420, filed on Nov. 15, 2002.

BACKGROUND OF THE INVENTION

1. Field of the Invention

The invention relates to an external power supply module, more particularly to an external power supply module that is adapted to be disposed in a portable electronic apparatus.

2. Description of the Related Art

As shown in FIG. 1, a conventional portable electronic apparatus 8, such as a portable computer, is usually powered by an internal battery (not shown) or by an external power supply module 9. Since the capacity of the internal battery only permits operation of the electronic apparatus 8 for a few hours, which is insufficient for long durations of use, the external power supply module 9 has thus become an essential component of the electronic apparatus 8. However, since the external power supply module 9 of the conventional electronic apparatus 8 is a separate accessory, inconveniences arise when a user brings the electronic apparatus 8 when going on a trip. Particularly, the separate external power supply module 9 increases the bulk of the electronic apparatus 8, and can be easily misplaced.

SUMMARY OF THE INVENTION

Therefore, the object of the present invention is to provide an external power supply module that is adapted to be disposed in a portable electronic apparatus and that includes a heat-dissipating unit.

According to the present invention, an external power supply module comprises a module case adapted to be disposed in a portable electronic apparatus, an adapter circuit disposed in the module case and adapted to convert AC power to DC power that is to be supplied to the portable electronic apparatus, a set of contacts provided on the module case and adapted to establish electrical connection between the adapter circuit and the portable electronic apparatus, and a heat-dissipating mounted on the module case for dissipating heat generated during operation of the adapter circuit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
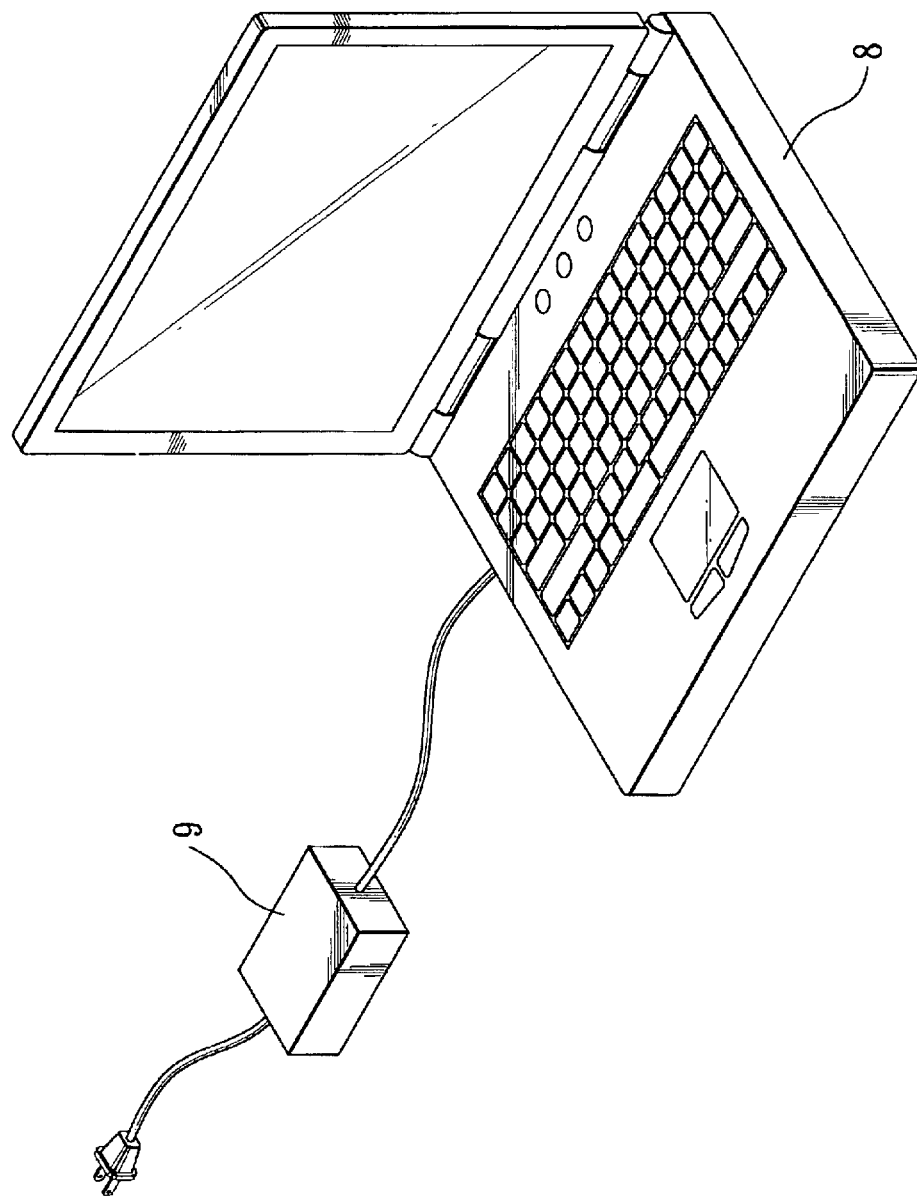
FIG. 1 is a perspective view of a conventional external power supply module connected to a portable electronic apparatus.

Before the present invention is described in greater detail, it should be noted that like elements are denoted by the same reference numerals throughout the disclosure.

Figure 2:
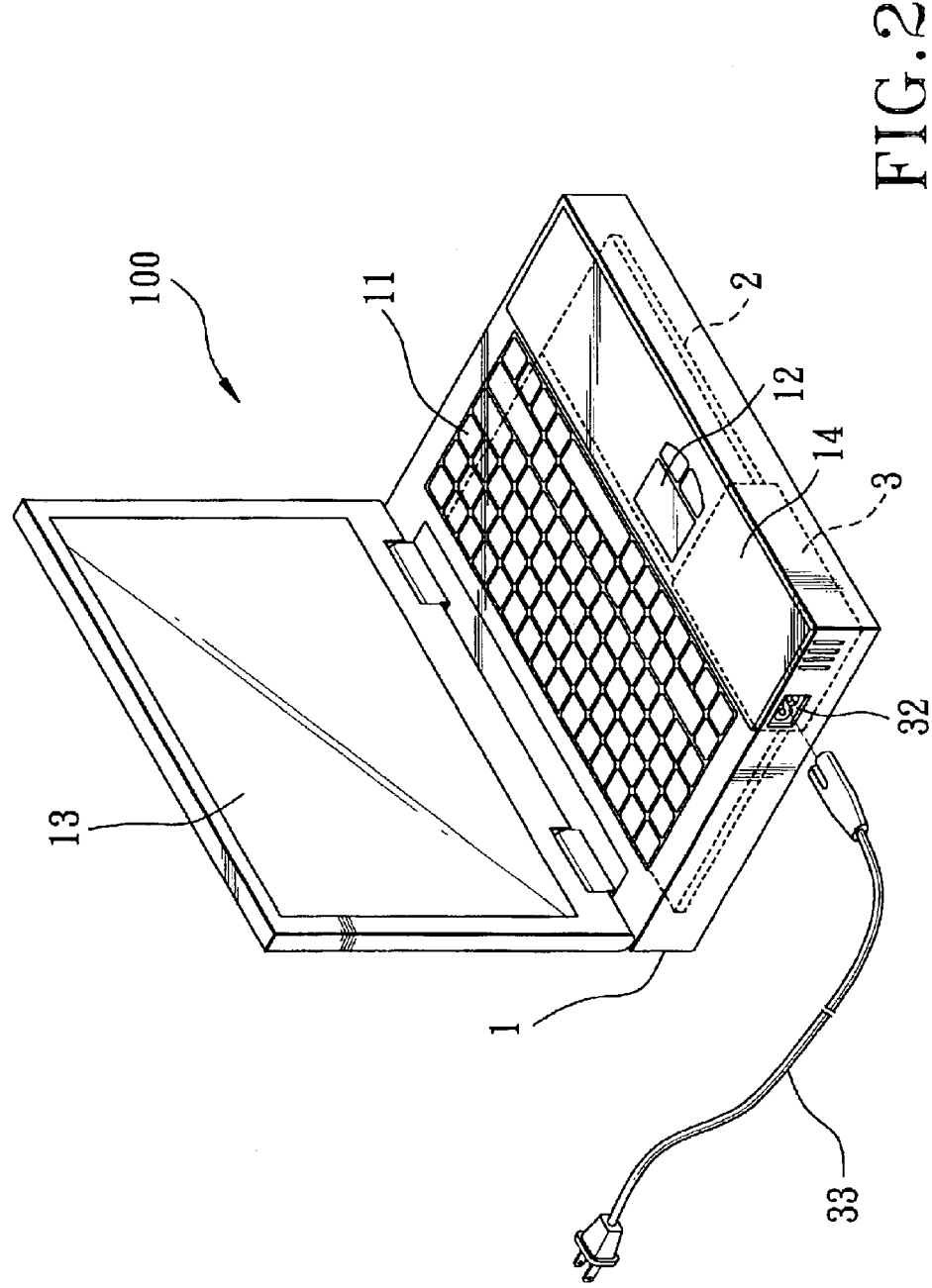
FIG. 2 is a perspective view of the first preferred embodiment of an external power supply module according to the present invention that is disposed in a portable electronic apparatus.

Referring to FIG. 2, the first preferred embodiment of an external power supply module 3 according to the present invention is adapted to be disposed in a portable electronic apparatus 100 (e.g. a notebook computer) that includes a housing 1. The housing 1 has first and second portions that are hinged together. The first portion, which is provided with manual input devices, such as a keyboard 11 and a touch-control pad 12, has a circuit unit 2 disposed in a circuit-receiving space thereof for controlling operations of the electronic apparatus 100. The second portion is provided with a liquid crystal display panel 13.

Figure 3:
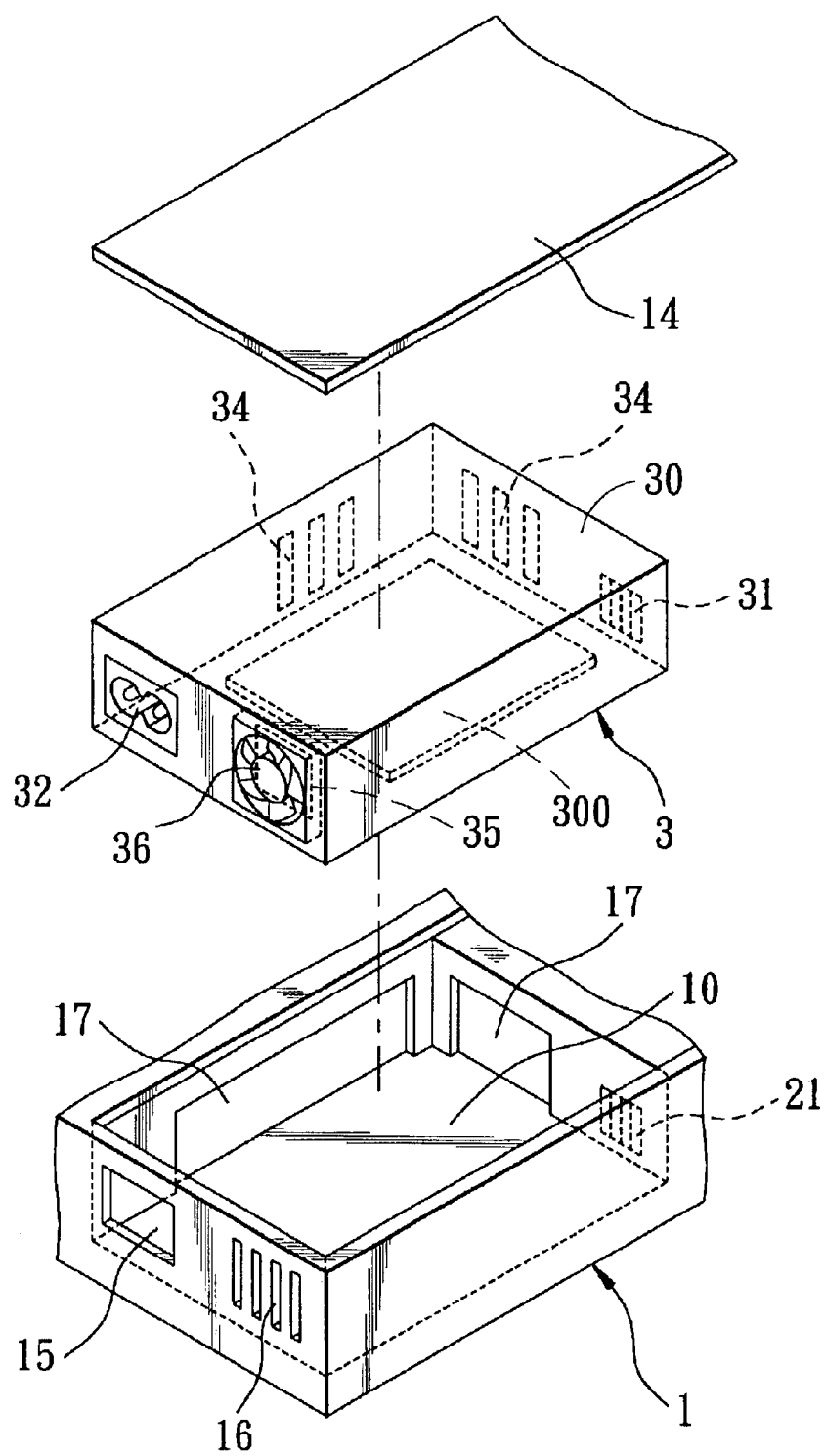
FIG. 3 is a fragmentary exploded perspective view of the first preferred embodiment.

With further reference to FIG. 3, the first portion of the housing 1 of the electronic apparatus 100 is further formed with a module receiving space 10 and a detachable panel 14 that permits access to the module receiving space 10 for installing and removing the external power supply module 3 from the module receiving space 10. A set of first contacts 21 is disposed in the module receiving space 10 and is coupled electrically to the circuit unit 2. In this embodiment, the first portion of the housing 1 of the electronic apparatus 100 is formed with a cable hole 15, first vent holes 16, and second vent holes 17.

The external power supply module 3 is adapted to supply electric power to the circuit unit 2, and includes a module case 30, an adapter circuit 300, a set of second contacts 31, and a heat-dissipating unit. The module case 30 corresponds in size to the module receiving space 10 and is adapted to be disposed in the module receiving space 10. The adapter circuit 300 is disposed in the module case 30 and is adapted to convert AC power to DC power that is to be supplied to the circuit unit 2. The set of second contacts 31 is provided on the module case 30 and is coupled electrically to the adapter circuit 300. The set of second contacts 31 is configured to connect electrically with the set of first contacts 21 when the module case 30 is disposed in the module receiving space 10 for establishing electrical connection between the adapter circuit 300 and the circuit unit 2. Moreover, the module case 30 of the external power supply module 3 is provided with a cable connector 32 that is connected to the adapter circuit 300 and that is adapted to be connected to an electrical cable 33 to permit supply of AC power to the adapter circuit 300. The cable connector 32 is aligned with the cable hole 15 in the first portion of the housing 1 when the module case 30 is disposed in the module receiving space 10. The electrical cable 33 has a first end adapted to be connected to an external AC power source (not shown) and a second end provided with a connector to connect removably with the cable connector 32. In this embodiment, the module case 30 is formed with a fan hole 35 and vent holes 34. The vent holes 34 are aligned with the second vent holes 17 in the first portion of the housing 1 when the module case 30 is disposed in the module receiving space 10. The heat-dissipating unit for dissipating heat generated during operation of the adapter circuit 300 includes a heat-dissipating fan 36 that is mounted on the module case 30 at the fan hole 35 and that is aligned with the first vent holes 16 in the first portion of the housing 1 when the module case 30 is disposed in the module receiving space 10. The heat-dissipating fan 36 is operable so as to draw air into the module case 30 through the vent holes 17, 34, and to expel the air out of the module case 30 through the vent and fan holes 16, 35. In this embodiment, the heat-dissipating fan 36 is an axial fan.

When the external power supply module 3 is disposed in the module receiving space 10, the second contacts 31 will establish electrical connection with the first contacts 21. As such, when the electrical cable 33 connects the cable connector 32 to the external AC power source, the heat-dissipating fan 36 can operate to draw the air from the first portion of the housing 1 into the module case 30 through the vent holes 17, 34, and to expel the air out of the module case 30 through the vent and fan holes 16, 35. The object of the present invention to dissipate heat generated by the adapter circuit 300 of the external power supply module 3 is thus met.

Figure 4:
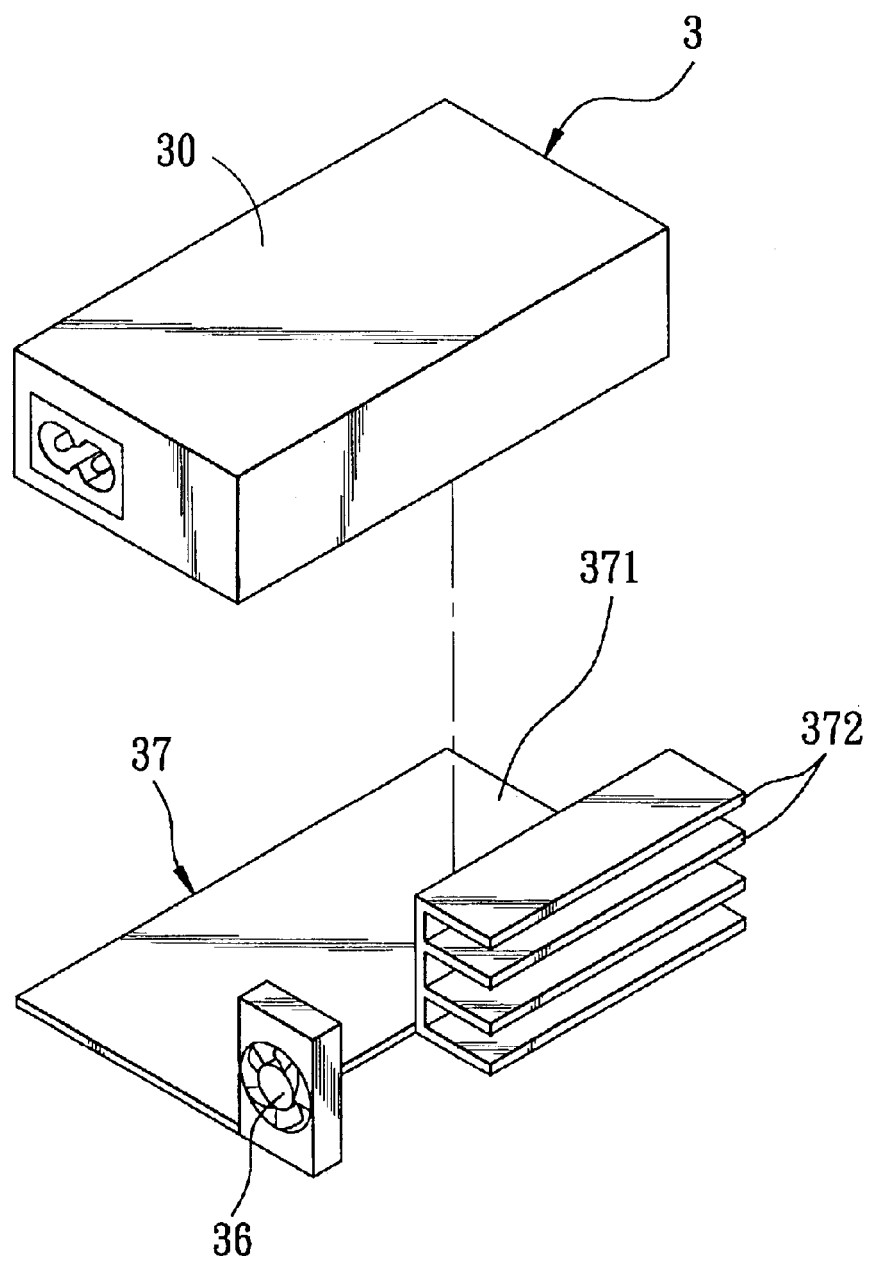
FIG. 4 is an exploded perspective view of the second preferred embodiment of an external power supply module according to the present invention.
Figure 5:
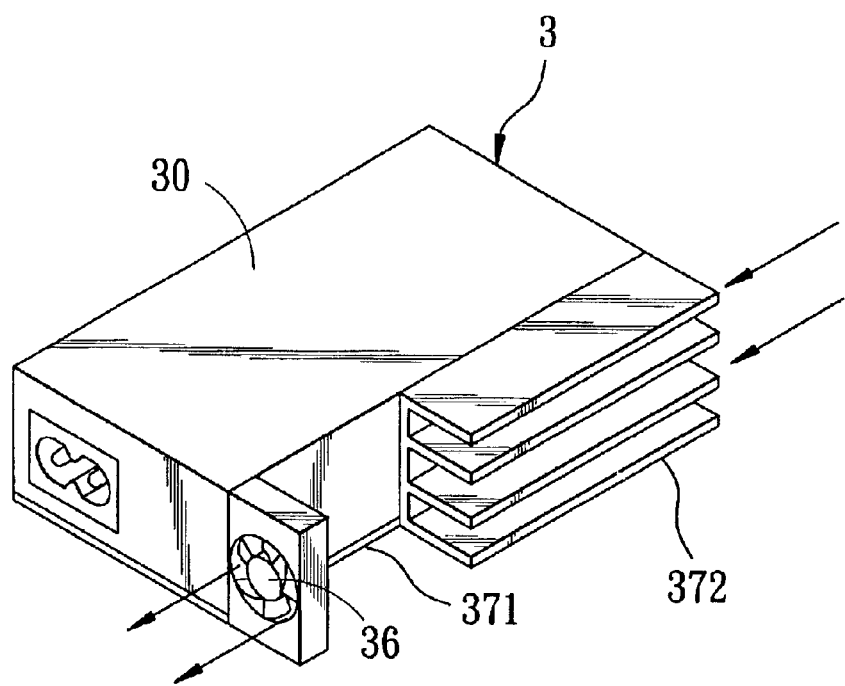
FIG. 5 is an assembled perspective view of the second preferred embodiment.

FIGS. 4 and 5 illustrate the second preferred embodiment of an external power supply module 3 according to the present invention. When compared with the first preferred embodiment, the heat-dissipating unit of this embodiment further includes a thermal conductor 37 having a base plate 371 in contact with the module case 30, and heat-dissipating fins 372 connected to an edge of the base plate 371. The base plate 371 and the heat-dissipating fins 372 are made of a thermally conductive material, such as aluminum. The heat-dissipating fins 372 extend horizontally and are vertically spaced apart from each other. The heat-dissipating fan 36 is connected to the same edge of the base plate 371 as the heat-dissipating fins 372, and is spaced apart from and is disposed in front of the heat-dissipating fins 372. The heat-dissipating fan 36 is operable so as to draw air for cooling the heat-dissipating fins 372 of the thermal conductor 37. As such, heat generated by the external power supply module 3 can be dissipated accordingly.

Figure 6:
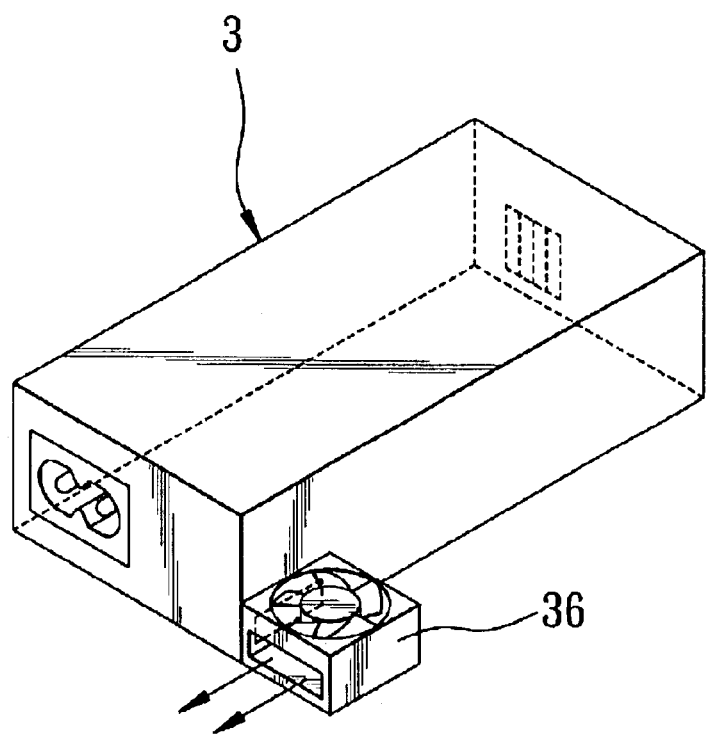
FIG. 6 is perspective view of the third preferred embodiment of an external power supply module according to the present invention.

FIG. 6 illustrates the third preferred embodiment of an external power supply module 3 according to the present invention. When compared with the previous preferred embodiments, the heat-dissipating fan 36 is a centrifugal fan. The centrifugal fan has an advantage in terms of flexibility in arranging with other electronic components due to its lower height.

From the above description, the external power supply module 3 includes a heat-dissipating unit that dissipates heat generated during operation of the adapter circuit 300 of the external power supply module 3. Further, since the external power supply module 3 is disposed in the electronic apparatus 100, there is no need for the user to carry the external power supply module 3 separately, thereby overcoming the aforesaid drawbacks of the prior art.

While the present invention has been described in connection with what is considered the most practical and preferred embodiments, it is understood that this invention is not limited to the disclosed embodiment but is intended to cover various arrangements included within the spirit and scope of the broadest interpretation so as to encompass all such modifications and equivalent arrangements.

I claim:

1. An external power supply module adapted to be disposed in a module receiving space of a housing of a portable electronic apparatus, said external power supply module being adapted to supply electric power to a circuit unit disposed in a circuit receiving space of the housing of the portable electronic apparatus, and comprising:

a module case adapted to be disposed in the module receiving space;

an adapter circuit disposed in said module case and adapted to convert AC power to DC power that is to be supplied to the circuit unit;

a set of contacts provided on said module case and adapted to establish electrical connection between said adapter circuit and the circuit unit; and a heat-dissipating unit including a heat-dissipating fan mounted on said module case for dissipating heat generated during operation of said adapted circuit, wherein said heat-dissipating unit further includes a thermal conductor in contact with said module case, and wherein said thermal conductor includes a base plate in contact with said module case, and a plurality of heat-dissipating fins connected to said base plate, said heat-dissipating fan being operable so as to draw air for cooling said heat-dissipating fins of said thermal conductor.

2. The external power supply module as claimed in claim 1, wherein said module case is provided with a cable connector that is connected to said adapter circuit and that is adapted to be connected to an electrical cable to permit supply of AC power to said adapter circuit.

3. The external power supply module as claimed in claim 1, wherein said module case is formed with a fan hole and a plurality of vent holes, said heat-dissipating fan being mounted on said module case at said fan hole and being operable so as to draw air from said module case through said vent holes and to expel air out of said module case through said fan hole.

4. The external power supply module as claimed in claim 1, said heat-dissipating fan and said heat-dissipating fins are connected to a same edge of said base plate, said heat-dissipating fan being spaced apart from said heat-dissipating fins.

5. The external power supply module as claimed in claim 1, wherein said heat-dissipating fan is an axial fan.

6. The external power supply module as claimed in claim 1, wherein said heat-dissipating fan is a centrifugal fan.

7. The external power supply module as claimed in claim 4, wherein said heat-dissipating fins extend horizontally and are vertically spaced apart from each other.

* * * * *